(12) United States Patent
Kong et al.

(10) Patent No.: US 9,658,496 B2
(45) Date of Patent: May 23, 2017

(54) MANUFACTURING METHOD OF LIQUID CRYSTAL DISPLAY

(71) Applicant: SAMSUNG DISPLAY CO., LTD, Yongin, Gyeonggi-Do (KR)

(72) Inventors: Tae Jin Kong, Suwon-si (KR); Sang Gyun Kim, Hwaseong-si (KR); Taek Joon Lee, Hwaseong-Si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 24 days.

(21) Appl. No.: 14/922,445

(22) Filed: Oct. 26, 2015

(65) Prior Publication Data
US 2016/0202561 A1  Jul. 14, 2016

(30) Foreign Application Priority Data
Jan. 13, 2015 (KR) .................. 10-2015-0006319

(51) Int. Cl.
G02F 1/1337 (2006.01)
G02F 1/139 (2006.01)

(52) U.S. Cl.
CPC .. G02F 1/133788 (2013.01); G02F 1/133711 (2013.01); G02F 1/1393 (2013.01);
(Continued)

(58) Field of Classification Search
CPC ......... G02F 1/133788; G02F 1/133711; G02F 2001/133715; G02F 1/1393; G02F 2001/133726
See application file for complete search history.

(56) References Cited

U.S. PATENT DOCUMENTS

2011/0025967 A1* 2/2011 Sohn ................. G02F 1/133711
349/124
2013/0129965 A1 5/2013 Jeong et al.
(Continued)

FOREIGN PATENT DOCUMENTS

CN 103135286 A 6/2013
CN 104122719 A 10/2014
(Continued)

*Primary Examiner* — Donald Raleigh
*Assistant Examiner* — Kevin Quarterman
(74) *Attorney, Agent, or Firm* — Robert E. Bushnell, Esq.

(57) ABSTRACT

A manufacturing method of a liquid crystal display according to an exemplary embodiment of the present invention includes: a step of preparing a lower panel in which a pixel electrode is formed and which is coated with a lower alignment layer including reactive mesogen; a step of preparing an upper panel in which a common electrode is formed and which is coated with an upper alignment layer including reactive mesogen; a step of forming a display panel assembly by injecting a liquid crystal between the lower panel and the upper panel and bonding the lower panel and the upper panel; a step of pre-tilting the liquid crystal by applying a voltage to the display panel assembly and primarily irradiating ultraviolet rays having a wavelength of 310 nm to 380 nm; and a step of removing remaining reactive mesogen by secondarily irradiating ultraviolet rays having a wavelength of 300 nm to 360 nm to the display panel assembly.

16 Claims, 11 Drawing Sheets

(52) U.S. Cl.
CPC ............ *G02F 2001/133715* (2013.01); *G02F 2001/133726* (2013.01)

(56) References Cited

U.S. PATENT DOCUMENTS

| | | |
|---|---|---|
| 2013/0208222 A1 | 8/2013 | Song |
| 2014/0063428 A1 | 3/2014 | Lee et al. |
| 2014/0320790 A1 | 10/2014 | Lee et al. |

FOREIGN PATENT DOCUMENTS

| | | |
|---|---|---|
| EP | 2597134 A2 | 5/2013 |
| EP | 2796923 A1 | 10/2014 |
| JP | 2013109353 A | 6/2013 |
| JP | 2014215614 A | 11/2014 |
| KR | 10-2002-0018028 A | 3/2002 |
| KR | 10-2002-0040575 A | 5/2002 |
| KR | 10-2012-0031440 A | 4/2012 |
| KR | 1020130057153 A | 5/2013 |
| KR | 1020140031668 A | 3/2014 |
| KR | 1020140127641 A | 11/2014 |

\* cited by examiner

MANUFACTURING METHOD OF LIQUID CRYSTAL DISPLAY

CLAIM OF PRIORITY

This application claims the priority to and all the benefits accruing under 35 U.S.C. §119 of Korean Patent Application No. 10-2015-0006319 filed in the Korean Intellectual Property Office (KIPO) on Jan. 13, 2015, the entire contents of which are incorporated herein by reference.

BACKGROUND OF INVENTION

1. Field of Disclosure

The present invention relates to a manufacturing method of a liquid crystal display.

2. Description of the Related Art

A liquid crystal display is one of the most widely used types of a flat panel display, and includes two display panels in which field generating electrodes, such as pixel electrodes and a common electrode, are provided, and a liquid crystal layer interposed between the two display panels. In the liquid crystal display, a voltage is applied to the field generating electrodes to generate an electric field in the liquid crystal layer, and the orientation of liquid crystal molecules of the liquid crystal layer is determined and the polarization of incident light is controlled by the generated electric field to display an image.

Inside the display panels, an alignment layer for aligning the liquid crystal molecules of the liquid crystal layer is formed. When a voltage is not applied to the field generating electrode, the liquid crystal molecules are aligned in a defined direction by the alignment layer, whereas when a voltage is applied to the field generating electrode, the liquid crystal molecules are rotated along a direction of the electric field.

For such alignment of the liquid crystal, there has been adopted a rubbing process in which a polymer alignment layer is formed and the alignment layer is rubbed so as to be aligned with a rotating roller which is wrapped with a rubbing cloth made of nylon or rayon while the rotating roller is rotated at a high speed. However, the rubbing process may create scratches on a surface of a liquid crystal alignment agent due to mechanical rubbing, or generate high static electricity which leads to destruction of thin film transistors. Further, micro fibers released from the rubbing cloth may cause defects, which become a barrier to improvement in production yield.

To overcome the problems with the rubbing process and achieve innovation in the aspect of production yield, there has been derived a liquid crystal alignment method using a light such as UV radiation (hereinafter, referred to as "photo-alignment"). Photo-alignment refers to the mechanism using a linearly polarized UV radiation to cause the photoreactive groups bonded to a defined photoreactive polymer to participate in a photoreaction and aligning the main chain of the polymer in a defined direction to form a photo-polymerized liquid crystal alignment layer with aligned liquid crystals.

The above information disclosed in this Background section is only for enhancement of understanding of the background of the invention and therefore it may contain information that does not form the prior art that is already known in this country to a person of ordinary skill in the art.

SUMMARY OF INVENTION

The present invention has been made in an effort to provide a manufacturing method of a liquid crystal display in which a problem of a vertical stripe pattern and water spots recognized in an alignment layer including reactive mesogen is solved.

An exemplary embodiment of the present invention provides a manufacturing method of a liquid crystal display including: a step of preparing a lower panel in which a pixel electrode is formed and which is coated with a lower alignment layer including reactive mesogen; a step of preparing an upper panel in which a common electrode is formed and which is coated with an upper alignment layer including reactive mesogen; a step of forming a display panel assembly by injecting a liquid crystal between the lower panel and the upper panel and bonding the lower panel and the upper panel; a step of pre-tilting the liquid crystal by applying a voltage to the display panel assembly and primarily irradiating ultraviolet rays having a wavelength of 310 nm to 380 nm; and a step of removing remaining reactive mesogen by secondarily irradiating ultraviolet rays having a wavelength of 300 nm to 360 nm to the display panel assembly.

The lower alignment layer and the upper alignment layer may include a main chain and one or more side chains connected to the main chain, and the side chain may include one or more reactive mesogen side chains.

The one or more side chains may include one or more kinds of vertical alignment side chain and two or more kinds of reactive mesogen side chain, and the reactive mesogen side chain may include a main reactive mesogen side chain and a sub-reactive mesogen side chain.

The main chain may include one or more selected from the group consisting of polyimide, polyamic acid, polyamide, polyamicimide, polyester, polyethylene, polyurethane, and polystyrene.

The reactive mesogen side chain may include at least one acryl group or methacryl group at an end thereof.

In the step of preparing a lower panel in which a pixel electrode is formed and which is coated with a lower alignment layer including reactive mesogen, the pixel electrode may include a first sub-pixel electrode and a second sub-pixel electrode.

In the step of pre-tilting the liquid crystal by applying a voltage to the display panel assembly and primarily irradiating ultraviolet rays having a wavelength of 310 nm to 380 nm, by applying the voltage to the display panel assembly, different voltages may be applied to the first sub-pixel electrode and the second sub-pixel electrode, respectively.

The step of pre-tilting the liquid crystal by applying a voltage to the display panel assembly and primarily irradiating ultraviolet rays having a wavelength of 310 nm to 380 nm may be performed for 30 seconds or more to 3 minutes or less.

In the step of pre-tilting the liquid crystal by applying a voltage to the display panel assembly and primarily irradiating ultraviolet rays having a wavelength of 310 nm to 380 nm, the ultraviolet rays may have a peak intensity at 365 nm.

In the step of pre-tilting the liquid crystal by applying a voltage to the display panel assembly and primarily irradiating ultraviolet rays having a wavelength of 310 nm to 380 nm, the liquid crystal may be aligned in a defined direction by applying the voltage, and the reactive mesogen side chain may react so as to be hardened by primarily irradiating the ultraviolet rays.

In the step of removing remaining reactive mesogen by secondarily irradiating ultraviolet rays having a wavelength of 300 nm to 360 nm to the display panel assembly, the ultraviolet rays may have a peak intensity at 340 nm.

In the step of removing remaining reactive mesogen by secondarily irradiating ultraviolet rays having a wavelength of 300 nm to 360 nm to the display panel assembly, a time for irradiating the ultraviolet rays may be 60 minutes to 80 minutes.

After the step of removing remaining reactive mesogen by secondarily irradiating ultraviolet rays having a wavelength of 300 nm to 360 nm to the display panel assembly, a voltage holding rate "VHR" of the liquid crystal display may be 96.7% or more.

The step of removing remaining reactive mesogen by secondarily irradiating ultraviolet rays having a wavelength of 300 nm to 360 nm to the display panel assembly may be performed in a state where a voltage is not applied to the display panel assembly.

The wavelength of the ultraviolet rays used in the step of pre-tilting the liquid crystal by applying a voltage to the display panel assembly and primarily irradiating ultraviolet rays having a wavelength of 310 nm to 380 nm may be longer than the wavelength of the ultraviolet rays used in the step of removing remaining reactive mesogen by secondarily irradiating ultraviolet rays having a wavelength of 300 nm to 360 nm to the display panel assembly.

The ultraviolet rays used in the step of removing remaining reactive mesogen by secondarily irradiating ultraviolet rays having a wavelength of 300 nm to 360 nm to the display panel assembly may be fluorescent ultraviolet rays.

As described above, in the manufacturing method of a liquid crystal display according to an exemplary embodiment of the present invention, when an alignment layer including reactive mesogen is hardened, ultraviolet rays are secondarily irradiated, and, thus, non-reacted reactive mesogen is removed and a problem of a vertical stripe pattern and water spots recognized in the alignment layer is solved.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION

Figure 1:
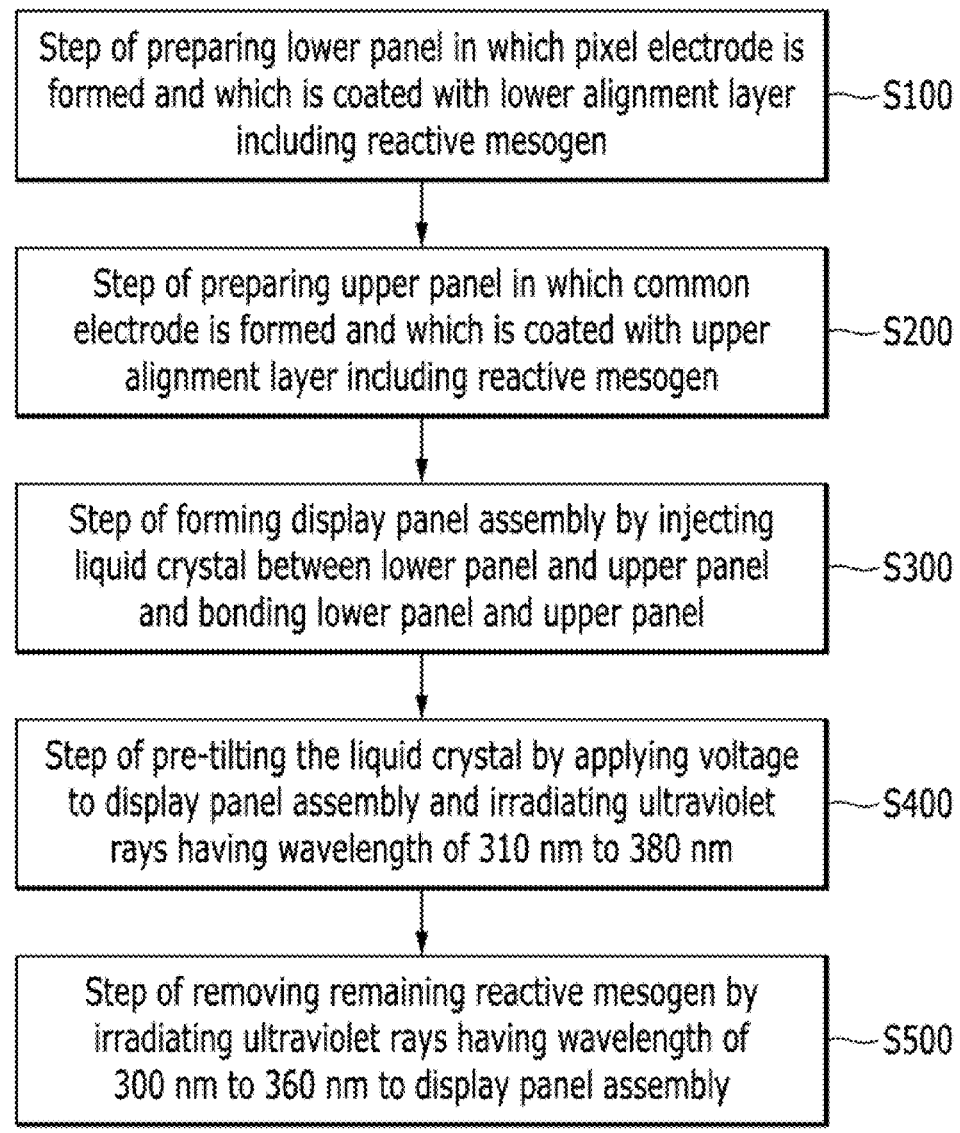
FIG. 1 is a flowchart illustrating a manufacturing method of a liquid crystal display according to an exemplary embodiment of the present invention.

The present invention will be described more fully hereinafter with reference to the accompanying drawings, in which exemplary embodiments of the invention are illustrated. As those skilled in the art would realize, the described embodiments may be modified in various different ways, all without departing from the spirit or scope of the present invention.

In the drawings, the thicknesses of layers, films, panels, regions, and the like, are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a manufacturing method of a liquid crystal display according to an exemplary embodiment of the present invention will be described.

FIG. 1 is a flowchart illustrating a manufacturing method of a liquid crystal display according to an exemplary embodiment of the present invention.

Referring to FIG. 1, a manufacturing method of a liquid crystal display according to an exemplary embodiment of the present invention includes: a step of preparing a lower panel in which a pixel electrode is formed and which is coated with a lower alignment layer including reactive mesogen; a step of preparing an upper panel in which a common electrode is formed and which is coated with an upper alignment layer including reactive mesogen; a step of forming a display panel assembly by injecting a liquid crystal between the lower panel and the upper panel and bonding the lower panel and the upper panel; a step of pre-tilting the liquid crystal by applying a voltage to the display panel assembly and irradiating ultraviolet rays having a wavelength of 310 nm to 380 nm; and a step of removing remaining reactive mesogen by irradiating ultraviolet rays having a wavelength of 300 nm to 360 nm to the display panel assembly.

Hereinafter, each step will be described in detail.

Referring to FIG. 1, the manufacturing method of a liquid crystal display of the present invention includes: a step of preparing a lower panel in which a pixel electrode is formed and which is coated with a lower alignment layer including reactive mesogen; and a step of preparing an upper panel in which a common electrode is formed and which is coated with an upper alignment layer including reactive mesogen.

Figure 2:
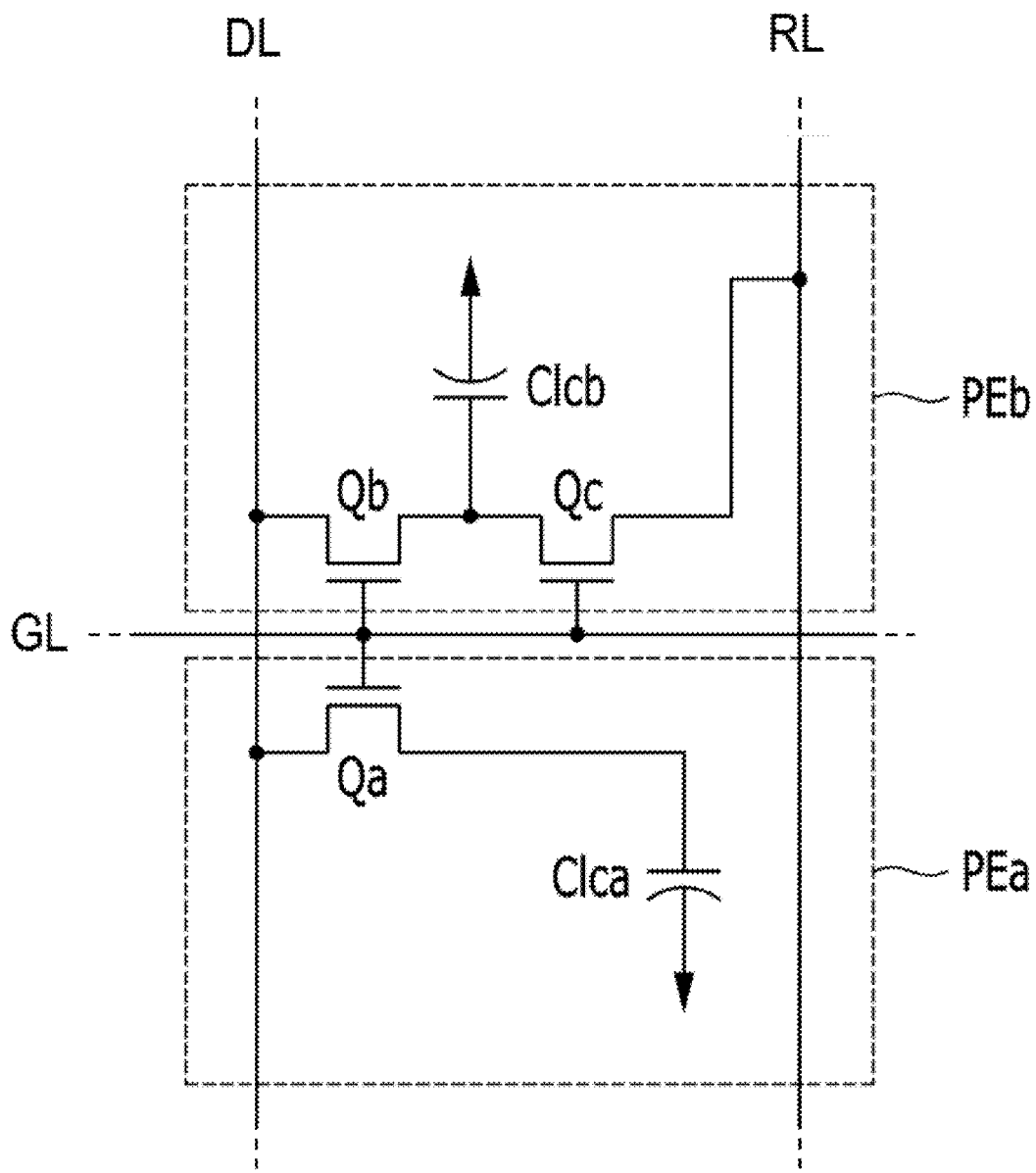
FIG. 2 is an equivalent circuit diagram of a pixel in a liquid crystal display according to an exemplary embodiment of the present invention.

Referring to FIG. 2, alignment of signal lines and pixels in a liquid crystal display finally manufactured according to an exemplary embodiment of the present invention and a method for driving the liquid crystal display will be described. FIG. 2 is an equivalent circuit diagram of a pixel in a liquid crystal display according to an exemplary embodiment of the present invention.

Referring to FIG. 2, a pixel PX in liquid crystal display according to the present exemplary embodiment includes: a plurality of signal lines including a gate line GL for transmitting a gate signal, a data line DL for transmitting a data signal, and a divided reference voltage line RL for transmitting a voltage dividing reference voltage; and first, second, and third switching elements Qa, Qb, and Qc and first and second liquid crystal capacitors Clca and Clcb connected to the plurality of signal lines.

The first and second switching elements Qa and Qb are connected to the gate line GL and the data line DL, respectively, and the third switching element Qc is connected to an output terminal of the second switching element Qb and the divided reference voltage line RL.

The first switching element Qa and the second switching element Qb are three-terminal elements such as a thin film transistor, and control terminals thereof are connected to the gate line GL and input terminals thereof are connected to the data line DL. An output terminal of the first switching element Qa is connected to the first liquid crystal capacitor Clca, and the output terminal of the second switching element Qb is connected to the second liquid crystal capacitor Clcb and an input terminal of the third switching element Qc.

The third switching element Qc is also a three-terminal element such as a thin film transistor, and a control terminal thereof is connected to the gate line GL, an input terminal thereof is connected to the second liquid crystal capacitor Clcb, and an output terminal thereof is connected to the divided reference voltage line RL.

If a gate-on signal is applied to the gate line GL, the first switching element Qa, second switching element Qb and third switching element Qc connected thereto are turned on. A data voltage applied to the data line DL accordingly is applied to a first sub-pixel electrode PEa and a second sub-pixel electrode PEb through the turned-on first switching element Qa and second switching element Qb. In this case, the data voltages applied to the first sub-pixel electrode PEa and the second sub-pixel electrode PEb are equivalent to each other, and the first liquid crystal capacitor Clca and the second liquid crystal capacitor Clcb are charged to substantially the same value by a difference between a common voltage and the data voltage. Simultaneously, the voltage charged in the second liquid crystal capacitor Clcb is divided through the turned-on third switching element Qc. As a result, a voltage value charged in the second liquid crystal capacitor Clcb is lowered by a difference between the common voltage and the divided reference voltage. That is, the voltage charged in the first liquid crystal capacitor Clca is higher than the voltage charged in the second liquid crystal capacitor Clcb.

As such, the voltage charged in the first liquid crystal capacitor Clca becomes different from the voltage charged in the second liquid crystal capacitor Clcb. Since the voltage charged in the first liquid crystal capacitor Clca is different from the voltage charged in the second liquid crystal capacitor Clcb inclined angles of liquid crystal molecules are different from each other in a first sub-pixel and a second sub-pixel, so that luminance of the two sub-pixels varies. Accordingly, an image viewed from a side may be substantially close to an image viewed from a front by appropriately controlling the voltage of the first liquid crystal capacitor Clca and the voltage of the second liquid crystal capacitor Clcb, thereby substantially improving side visibility.

In the illustrated exemplary embodiment, in order to differentiate the voltage charged in the first liquid crystal capacitor Clca and the voltage charged in the second liquid crystal capacitor Clcb, the third switching element Qc connected to the second liquid crystal capacitor Clcb and the divided reference voltage line RL is included, but in the liquid crystal display according to another exemplary embodiment of the present invention, the second liquid crystal capacitor Clcb may be connected to a step-down capacitor. To be specific, the third switching element including a first terminal connected to a step-down gate line, a second terminal connected to the second liquid crystal capacitor Clcb and a third terminal connected to the step-down capacitor is included to charge a portion of charges charged in the second liquid crystal capacitor Clcb in the step-down capacitor, so that the charged voltages in the first liquid crystal capacitor Clcb and the second liquid crystal capacitor Clcb may be differently set. Further, in the liquid crystal display according to another exemplary embodiment of the present invention, the first liquid crystal capacitor Clcb and the second liquid crystal capacitor Clcb are connected to different data lines, respectively, to receive different data voltages, and as a result, the charged voltages in the first liquid crystal capacitor Clcb and the second liquid crystal capacitor Clcb may be differently set. The charged voltages in the first liquid crystal capacitor Clcb and the second liquid crystal capacitor Clcb may be differently set using other various methods.

Hereinafter, referring to FIG. 3 to FIG. 6, a manufacturing method of a liquid crystal display includes: a step of preparing a lower panel in which a pixel electrode is formed and which is coated with a lower alignment layer including reactive mesogen and a step of preparing an upper panel in which a common electrode is formed and which is coated with an upper alignment layer including reactive mesogen will be described.

Figure 3:
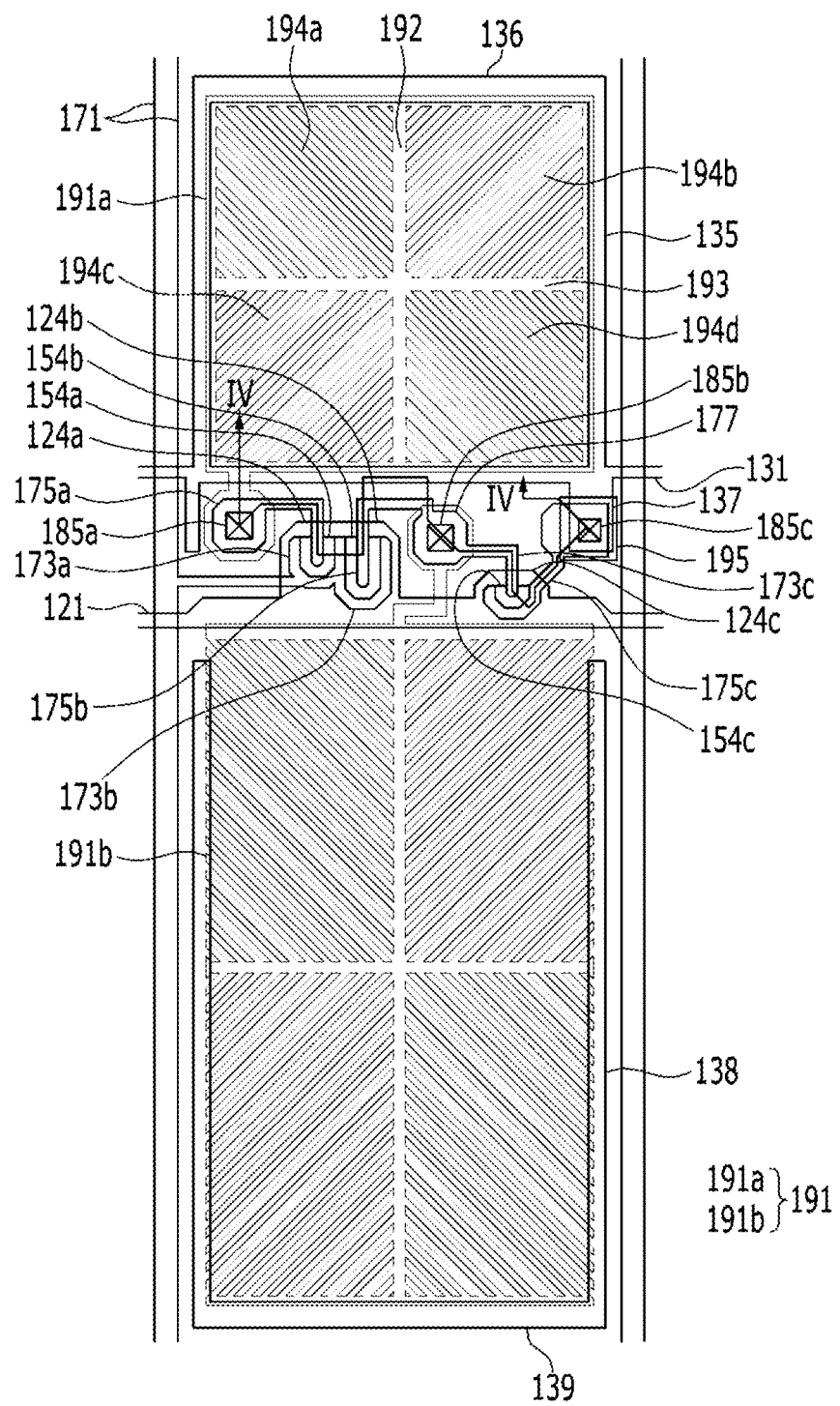
FIG. 3 is a layout view of a liquid crystal display according to an exemplary embodiment of the present invention.
Figure 4:
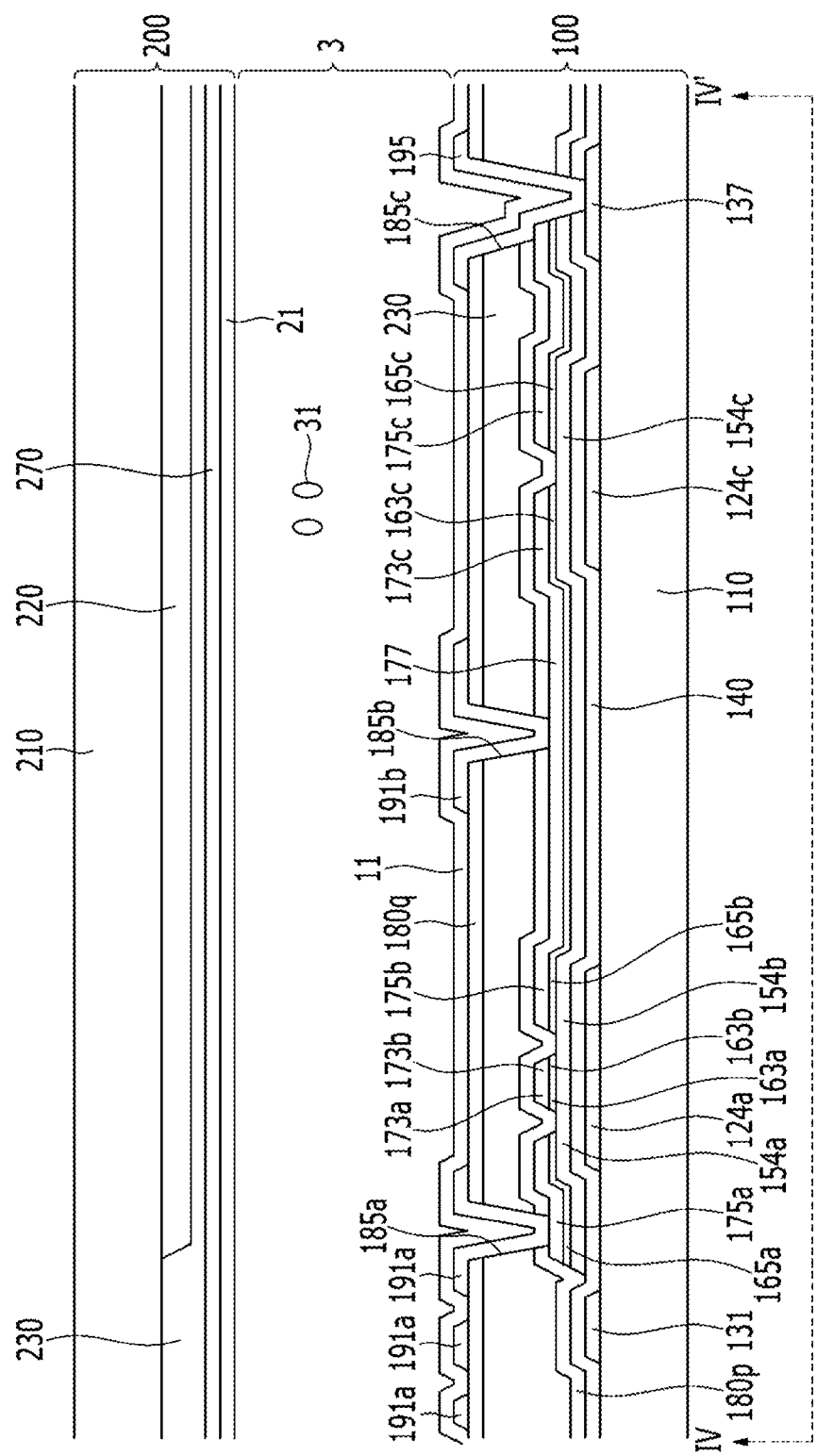
FIG. 4 is a cross-sectional view of the liquid crystal display of FIG. 3 taken along a line IV-IV'.
Figure 5:
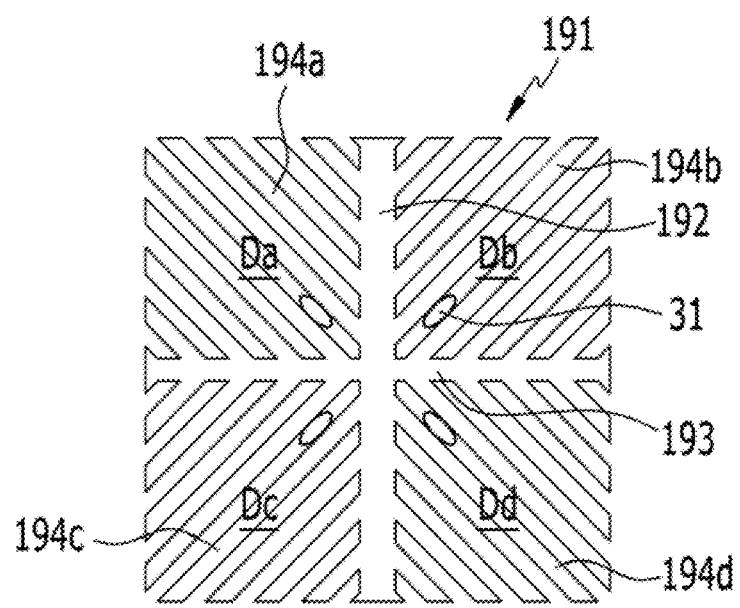
FIG. 5 is a top plan view illustrating a unit region of a pixel electrode of a lower panel according to an exemplary embodiment of the present invention.

FIG. 3 is a layout view of a liquid crystal display according to an exemplary embodiment of the present invention, and FIG. 4 is across-sectional view of the liquid crystal display of FIG. 3 taken along a line IV-IV'. FIG. 5 is a top plan view illustrating a unit region of a pixel electrode of a lower panel according to an exemplary embodiment of the present invention.

Firstly, a lower panel 100 prepared in the step of preparing a lower panel in which a pixel electrode is formed and which is coated with a lower alignment layer including reactive mesogen will be described.

On an insulation substrate 110 made of transparent glass, plastic, or the like, a gate conductor including a gate line 121 and a divided reference voltage line 131 is disposed.

The gate line 121 includes a wide end portion (not illustrated) for connection with a first gate electrode 124a, a second gate electrode 124b, a third gate electrode 124c, and other layers or an external driving circuit.

The divided reference voltage line 131 includes first storage electrodes 135 and 136 and a reference electrode 137. Second storage electrodes 138 and 139, which are not connected to the divided reference voltage line 131, are disposed so as to be overlapped with a second sub-pixel electrode 191b.

A gate insulating layer 140 is disposed on the gate line 121 and the divided reference voltage line 131.

A first semiconductor 154a, a second semiconductor 154b, and a third semiconductor 154c are disposed on the gate insulating layer 140.

A plurality of ohmic contacts 163a, 165a, 163b, 165b, 163c, and 165c is disposed on the semiconductors 154a, 154b, and 154c.

A data conductor including a plurality of data lines 171 including a first source electrode 173a and a second source electrode 173b, a first drain electrode 175a, a second drain electrode 175b, a third source electrode 173c, and a third drain electrode 175c is disposed on the ohmic contacts 163a, 165a, 163b, 165b, 163c, and 165c and the gate insulating layer 140.

The data conductor and the semiconductors and ohmic contacts disposed below the data conductor may be formed simultaneously using a single mask.

The data line 171 includes a wide end portion (not illustrated) for connection with other layers or an external driving circuit.

The first gate electrode 124a, the first source electrode 173a, and the first drain electrode 175a collectively constitute the first thin film transistor (TFT) Qa together with a first semiconductor island 154a, and a channel of the thin film transistor is formed in the semiconductor 154a between the first source electrode 173a and the first drain electrode 175a. Similarly, the second gate electrode 124b, the second source electrode 173b, and the second drain electrode 175b collectively constitute the second thin film transistor Qb together with a second semiconductor island 154b, and a channel is formed in the semiconductor 154b between the second source electrode 173b and the second drain electrode 175b. The third gate electrode 124c, the third source electrode 173c, and the third drain electrode 175c collectively constitute the third thin film transistor Qc together with a third semiconductor island 154c, and a channel is formed in the semiconductor 154c between the third source electrode 173c and the third drain electrode 175c.

The second drain electrode 175b is connected to the third source electrode 173c and includes a widely extended extension 177.

A first passivation layer 180p is disposed on the data conductors 171, 173c, 175a, 175b, and 175c, and exposed portions of the semiconductors 154a, 154b, and 154c. The first passivation layer 180p may include an inorganic insulating layer including silicon nitride or silicon oxide. The first passivation layer 180p may prevent a pigment of a color filter 230 from flowing into the exposed portions of the semiconductors 154a, 154b, and 154c.

The color filter 230 is disposed on the first passivation layer 180p. The color filter 230 extends in a vertical direction along two data lines which are adjacent to each other. A first light blocking member 220 is disposed on the first passivation layer 180p, an edge of the color filter 230, and the data line 171.

The color filter 230 may be disposed in the upper panel 200 rather than in the lower panel 100.

A second passivation layer 180q is disposed on the color filter 230.

The second passivation layer 180q may include an inorganic insulating layer including silicon nitride or silicon oxide. The second passivation layer 180q prevents the color filter 230 from being lifted and prevents a defect such as an afterimage which may occur when a screen is driven by suppressing contamination of the liquid crystal layer 3 due to an organic material such as a solvent which may flows in from the color filter 230.

A first contact hole 185a and a second contact hole 185b, which expose the first drain electrode 175a and the second drain electrode 175b, respectively, are formed in the first passivation layer 180p and the second passivation layer 180q.

A third contact hole 185c, which exposes a portion of the reference electrode 137 and a portion of the third drain electrode 175c, is formed in the first passivation layer 180p, the second passivation layer 180q, and the gate insulating layer 140, and the third contact hole 185c is covered by a connecting member 195. The connecting member 195 electrically connects the reference electrode 137 and the third drain electrode 175c, which are exposed through the third contact hole 185c.

A plurality of pixel electrodes 191 is disposed on the second passivation layer 180q. Each of the pixel electrodes 191 is spaced apart from each other with the gate line 121 interposed therebetween, and includes a first sub-pixel electrode 191a and a second sub-pixel electrode 191b, which are adjacent to each other in a column direction with the gate line 121 interposed therebetween. The pixel electrode 191 may include a transparent material such as ITO and IZO. The pixel electrode 191 may be formed of a transparent conductive material such as ITO or IZO, or a reflective metal such as aluminum, silver, chromium, or an alloy thereof.

Each of the first sub-pixel electrode 191a and the second sub-pixel electrode 191b includes one or more of a unit electrode illustrated in FIG. 5 or a modified form thereof.

The first sub-pixel electrode 191a and the second sub-pixel electrode 191b are physically and electrically connected to the first drain electrode 175a and the second drain electrode 175b, respectively, through the first contact hole 185a and the second contact hole 185b, respectively, and receive data voltages from the first drain electrode 175a and the second drain electrode 175b, respectively. In this case, a part of the data voltage applied to the second drain electrode 175b is divided through the third source electrode 173c, so that a magnitude of the voltage applied to the first sub-pixel electrode 191a is higher than a magnitude of voltage applied to the second sub-pixel electrode 191b.

The first sub-pixel electrode 191a and the second sub-pixel electrode 191b applied with the data voltages generate an electric field together with a common electrode 270 of the upper panel 200 to determine directions of liquid crystal molecules of the liquid crystal layer 3 between the two electrodes 191 and 270. Luminance of light passing through the liquid crystal layer 3 changes according to the determined directions of the liquid crystal molecules.

A lower alignment layer 11 is coated on the pixel electrode 191. The lower alignment layer 11 may include reactive mesogen at its side chain. The lower alignment layer will be described in detail later.

Hereinafter, a unit electrode 199 of the lower panel will be described with reference to FIG. 5.

As illustrated in FIG. 5, the overall shape of the unit electrode 199 is a quadrangle, and the unit electrode 199 includes a cross stem including a horizontal stem 193 and a vertical stem 192 perpendicular to each other. Further, the unit electrode 199 is divided into a first sub-region Da, a second sub-region Db, a third sub-region Dc, and a fourth sub-region Dd by the horizontal stem 193 and the vertical stem 192. The first to fourth sub-regions Da to Dd include a plurality of first micro branches 194a, a plurality of second micro branches 194b, a plurality of third micro branches 194c, and a plurality of fourth micro branches 194d, respectively.

The first micro branch 194a extends obliquely in an upper left direction from the horizontal stem 193 or the vertical stem 192, and the second micro branch 194b extends obliquely in an upper right direction from the horizontal stem 193 or the vertical stem 192. Further, the third micro branch 194c extends obliquely in a lower left direction from the horizontal stem 193 or the vertical stem 192, and the fourth micro branch 194d extends obliquely in a lower right direction from the horizontal stem 193 or the vertical stem 192.

The first to fourth micro branches 194a, 194b, 194c, and 194d form angles of about 45 degrees or about 135 degrees with the gate lines 121a and 121b or the horizontal stem 193. Further, the micro branches 194a, 194b, 194c, and 194d of two adjacent sub-regions Da, Db, Dc, and Dd may be substantially orthogonal to each other.

Widths of the micro branches 194a, 194b, 194c, and 194d may be in a range of 2.5 μm to 5.0 μm, and a distance between the adjacent micro branches 194a, 194b, 194c, and 194d in each of the sub-regions Da, Db, Dc, and Dd may be in a range of 2.5 μm to 5.0 μm.

According to another exemplary embodiment of the present invention, the widths of the micro branches 194a, 194b, 194c, and 194d may be increased as being closer to the horizontal stem 193 or the vertical stem 192, and a difference between the widest portion and the narrowest portion in the width of each micro branch 194a, 194b, 194c, or 194d may be in a range of 0.2 μm to 1.5 μm.

The first sub-pixel electrode 191a and the second sub-pixel electrode 191b are connected to the first drain electrode 175a and the second drain electrode 175b, respectively, through the first contact hole 185a and the second contact hole 185b, respectively, and receive the data voltages from the first drain electrode 175a and the second drain electrode 175b, respectively. In this case, sides of the first to fourth micro branches 194a, 194b, 194c, and 194d distort the electric field to generate horizontal components that determine inclined directions of the liquid crystal molecules 31. The horizontal components of the electric field are substantially parallel to the sides of the first to fourth micro branches 194a, 194b, 194c, and 194d. Accordingly, as illustrated in FIG. 4, the liquid crystal molecules 31 are inclined in directions substantially parallel to longitudinal directions of the micro branches 194a, 194b, 194c, and 194d. Since each pixel electrode 191 includes four sub-regions Da to Dd having different longitudinal directions of the micro branches 194a, 194b, 194c, and 194d, the inclined directions of the liquid crystal molecules 31 are substantially four directions, and four domains having different alignment directions of the liquid crystal molecules 31 are provided on the liquid crystal layer 3. When the inclined directions of the liquid crystal molecules are various as such, a reference viewing angle of the liquid crystal display is substantially increased.

Hereinafter, the upper panel 200 prepared in the step of preparing an upper panel in which a common electrode is formed and which is coated with an upper alignment layer including reactive mesogen will be described.

Referring to FIG. 3 and FIG. 4, a black matrix as a first light blocking member 220 is disposed on an insulation substrate 210. The black matrix 220 is disposed in the upper panel 200 so as to correspond to a region where the data lines are disposed and a region where the transistors are disposed in the lower panel 100.

An overcoat 250 is formed on the black matrix 220. The overcoat 250 may be omitted.

A common electrode 270 is disposed on the overcoat 250. An upper alignment layer 21 is coated on the common electrode 270. The upper alignment layer 21 may include reactive mesogen at its side chain.

Figure 6:
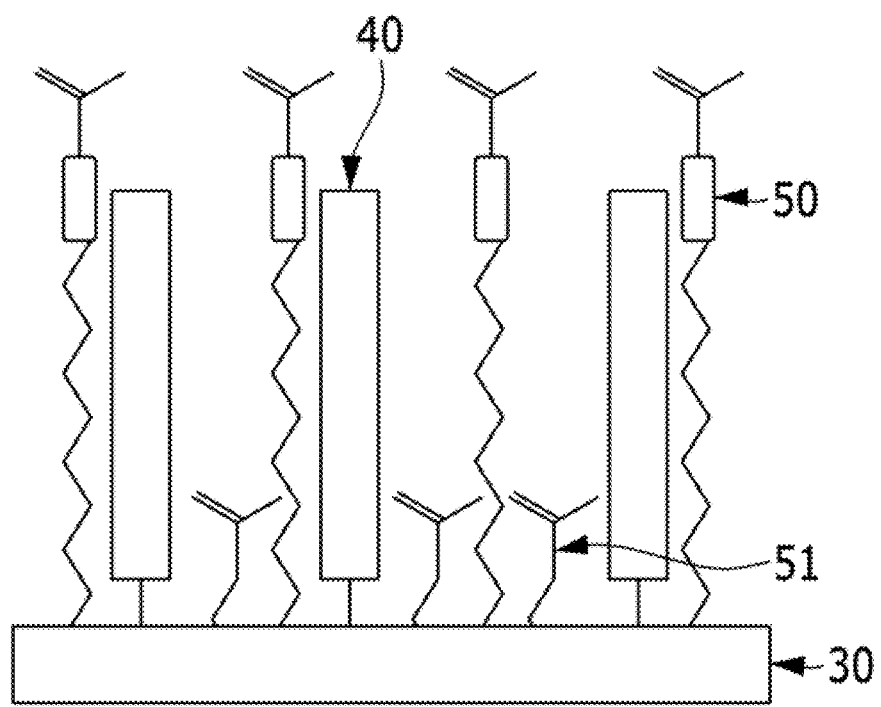
FIG. 6 simply illustrates a main chain and side chains of an alignment layer of the present invention.

Hereinafter, referring to FIG. 6, there will be described alignment layers of the lower panel and the upper panel respectively prepared in the step of preparing a lower panel in which a pixel electrode is formed and which is coated with a lower alignment layer including reactive mesogen and the step of preparing an upper panel in which a common electrode is formed and which is coated with an upper alignment layer including reactive mesogen. FIG. 6 simply illustrates a main chain and side chains of an alignment layer of the present invention.

The alignment layer to be described below is common between the lower alignment layer and the upper alignment layer.

Referring to FIG. 6, the alignment layer coated in the present invention includes a main chain 30 and one or more side chains connected to the main chain, and the one or more side chains includes one or more kinds of a vertical alignment side chain 40 and one or more kinds of a reactive mesogen side chain. The reactive mesogen side chain may include a main reactive mesogen side chain 50 and a sub-reactive mesogen side chain 51.

The reactive mesogen side chain includes the main reactive mesogen side chain 50 and the sub-reactive mesogen side chain 51, and a length of the main reactive mesogen side chain may be longer than a length of the sub-reactive mesogen side chain. That is, "the main reactive mesogen side chain" in the present invention refers to a longer reactive mesogen side chain among the reactive mesogen side chains connected to the main chain, and "the sub-reactive mesogen side chain" refers to a shorter reactive mesogen side chain among the reactive mesogen side chains connected to the main chain. However, in another exemplary embodiment of the present invention, only one reactive mesogen side chain may exist.

The main chain may be a polyimide main chain, but is not limited thereto. The main chain may include one or more selected from the group consisting of polyimide, polyamic acid, polyamide, polyamicimide, polyester, polyethylene, polyurethane, and polystyrene. As the main chain includes more cyclic structures, such as an imide group, a hardness of the main chain may be increased and electrical characteristics thereof may be improved. Thus, an occurrence of stains, which may occur when the liquid crystal display is driven for a long time, may decrease, and stability with respect to the pre-tilt of the alignment layer may increase.

The one or more side chains are connected to a diamine group of the main chain. The diamine may include photo-reactive diamine, vertical diamine, and normal diamine. At least one diamine of the photo-reactive diamine, the vertical diamine, and the normal diamine may be used in the manufacturing of a photo-alignment layer. Further, one or more kinds of photo-reactive diamine may be used in the manufacturing of a photo-alignment layer, or one or more kinds of vertical diamine or one or more kinds of normal diamine may be used. The vertical alignment properties and the alignment stability can be optimized by controlling a composition ratio of a copolymer of the photo-reactive diamine, the vertical diamine, and the normal diamine.

The one or more side chains include one or more kinds of a vertical alignment side chain and one or more kinds of a reactive mesogen side chain. The vertical alignment side chain has a function of securing a vertical alignment force in a vertical alignment "VA" mode.

The vertical alignment side chain may include one or more mesogen units in order to secure a vertical alignment force. The mesogen unit may include one or more selected from the group consisting of a colesteric group, a buphenyl group, a cyclohexyl benzene group, and a napthyl group.

The main reactive mesogen side chain and the sub-reactive mesogen side chain may include at least one acryl group or methacryl group at the ends thereof. The acryl or methacryl group forms a polymer by way of a photopolymerization reaction while ultraviolet rays are irradiated.

The photopolymerization reaction may occur between the main reactive mesogen side chains, between the sub-reactive mesogen side chains, and between the main reactive mesogen side chain and the sub-reactive mesogen side chain. Therefore, more reactions may occur as compared with a case where only one reactive mesogen side chain exists. Such reactive mesogen side chains react with each other during a subsequent process for irradiating ultraviolet rays.

Hereinafter, the step of forming a display panel assembly by injecting a liquid crystal between the lower panel and the upper panel and bonding the lower panel and the upper panel will be described.

As illustrated in FIG. 4, the liquid crystal layer 3 is formed by injecting a liquid crystal 31 between the lower panel 100 and the upper panel 200 and bonding the lower panel 100 and the upper panel 200, so that a display panel assembly is formed.

The liquid crystal layer 3 has negative dielectric anisotropy, and longitudinal axes of the liquid crystal molecules in the liquid crystal layer 3 may be aligned substantially vertical to surfaces of the two panels 100 and 200 when the electric field is not generated therein.

However, the structure of the display panel assembly exemplified in the above-described step is an example, and it is obvious that the lower panel and the upper panel have other structures different from the above-described examples, respectively. That is, any lower panel in which a pixel electrode exists and any upper panel in which a common electrode exists can be applied to the present invention without limitation. Also, in this case, the lower panel and the upper panel are respectively coated with the alignment layers including reactive mesogen at the side chains thereof.

Hereinafter, the step of pre-tilting the liquid crystal by applying a voltage to the display panel assembly and primarily irradiating ultraviolet rays having a wavelength of 310 nm to 380 nm will be described.

As described above, if a voltage is applied to the display panel assembly, liquid crystals are aligned in a defined direction by the applied voltage. In this case, if a voltage is applied to the display panel assembly, the reactive mesogen in the coated lower alignment layer and upper alignment layer reacts to give a pre-tilt angle to the liquid crystals.

That is, a voltage is applied to the display panel assembly, the liquid crystals are aligned in a defined direction by the voltage. In this case, if ultraviolet rays are irradiated in a state where the voltage is applied, a polymerization reaction occurs between the reactive mesogen side chains included in the lower alignment layer and the upper alignment layer, and, thus, the liquid crystals aligned in a defined direction are fixed.

A pre-tilt angle is given to the liquid crystals as such, and the given pre-tilt angle can improve a characteristic of the liquid crystal display by promoting alignment of the liquid crystals faster and better when the liquid crystal display is operated.

Figure 7:
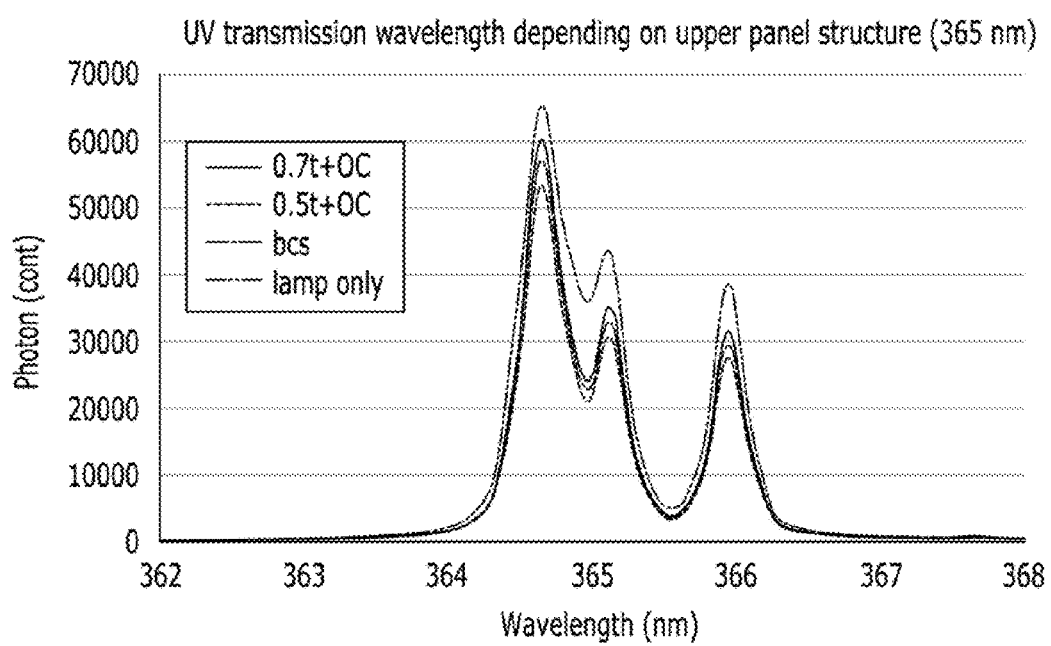
FIG. 7 illustrates a spectrum of ultraviolet rays irradiated in a step of primarily irradiating ultraviolet rays.

In this case, a wavelength of the ultraviolet rays irradiated in the present step may be in a range of 310 nm to 380 nm. To be specific, the ultraviolet rays irradiated in the present step may have a peak intensity at a wavelength of 365 nm. FIG. 7 illustrates a spectrum of ultraviolet rays irradiated in the present step. As illustrated in FIG. 7, the ultraviolet rays having a peak intensity at 365 nm are irradiated to the display panel assembly to react the reactive mesogen included in the alignment layer and give a pre-tilt angle to the liquid crystal molecules.

In this case, a time for irradiating the ultraviolet rays may be shorter than 10 minutes. More preferably, it may be shorter than 3 minutes. If a time for irradiating the ultraviolet rays increases, the lower panel or the upper panel may be damaged.

The voltage applied in the present step may be formed differently between the first sub-pixel electrode and the second sub-pixel electrode as described above in FIG. 1. That is, even if the same voltage is applied, the voltage is divided in the second sub-pixel electrode, and, thus, the voltage charged in the first liquid crystal capacitor Clca is different from the voltage charged in the second liquid crystal capacitor Clcb. Therefore, the liquid crystals are aligned at different degrees between the first sub-pixel electrode and the second sub-pixel electrode, and, thus, a pre-tilt angle of the liquid crystals can be differently given to the first sub-pixel electrode and the second sub-pixel electrode.

Hereinafter, the step of removing remaining reactive mesogen by secondarily irradiating ultraviolet rays having a wavelength of 300 nm to 360 nm to the display panel assembly will be described.

Non-reacted reactive mesogen remaining after the previous step without being reacted is reacted so as to be removed by irradiation of ultraviolet rays. That is, the ultraviolet rays irradiated in the present step have a wavelength shorter than the wavelength of the ultraviolet rays irradiated in the previous step (step of applying a voltage and primarily irradiating ultraviolet rays). Since the ultraviolet rays are secondarily irradiated as such, the remaining reactive mesogen which is not reacted in the previous step of primarily irradiating ultraviolet rays is reacted and removed.

In the previous step of pre-tilting the liquid crystal by applying a voltage to the display panel assembly and primarily irradiating ultraviolet rays having a wavelength of 310 nm to 380 nm, the reactive mesogen included in the form of a side chain in the alignment layer reacts and a pre-tilt angle is given to the liquid crystal molecules. However, not all of the reactive mesogen reacts. That is, in order to prevent damage to the display panel, ultraviolet rays cannot be irradiated to the display panel assembly for a long time in the previous step. Thus, the ultraviolet rays are irradiated for about 1 minute. Therefore, not all of the reactive mesogen included in the alignment layer reacts, but some of the reactive mesogen remains in a non-reactive state.

Figure 8:
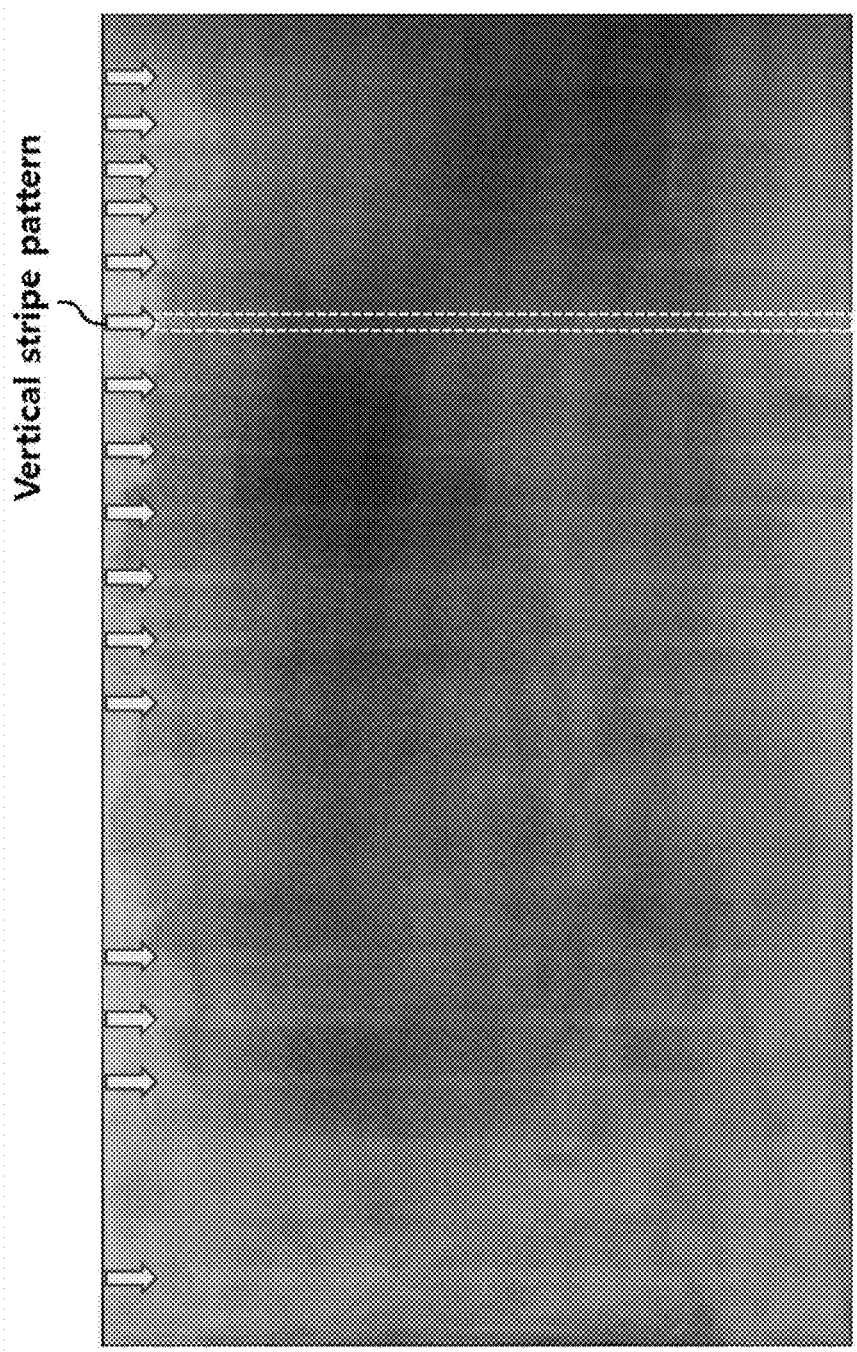
FIG. 8 illustrates spots in a liquid crystal display according to Comparative Example of the present invention.

Such non-reacted reactive mesogen will be recognized as spots in the liquid crystal display. FIG. 8 illustrates spots in a liquid crystal display according to Comparative Example of the present invention. That is, a manufacturing method of a liquid crystal display according to Comparative Example of the present invention is ended by a step of pre-tilting a liquid crystal by applying a voltage to the display panel assembly and irradiating ultraviolet rays having a wavelength of 310 nm to 380 nm, but does not include a step of irradiating ultraviolet rays having a wavelength of 300 nm to 360 nm as shown in the present invention. That is, in the liquid crystal display according to Comparative Example of the present invention, ultraviolet rays are irradiated only one time (primary irradiation), and only some of reactive mesogen included in an alignment layer reacts by the primary irradiation of ultraviolet rays and non-reacted reactive mesogen remains.

Accordingly, as illustrated in FIG. 8, such non-reacted reactive mesogen is recognized as spots. Vertical stripes indicated by arrows in FIG. 8 are spots in the alignment layer caused by the non-reacted reactive mesogen. Such vertical stripes have a negative effect on a display quality of the liquid crystal display and reduce a VHR.

However, the manufacturing method of a liquid crystal display according to the present invention includes a step of removing the remaining reactive mesogen by secondarily irradiating ultraviolet rays having a wavelength of 300 nm to 360 nm to the display panel assembly. The reactive mesogen remaining without being reacted is reacted and removed by irradiation of the ultraviolet rays. In this case, the wavelength for the secondary irradiation (removal of the non-reacted reactive mesogen) in the present step may be shorter than the wavelength for the primary irradiation (giving a pre-tilt angle to the liquid crystal). That is, the wavelength of the ultraviolet rays secondarily irradiated in the present step may be in a range of 300 nm to 360 nm. In this case, the irradiated ultraviolet rays may have a peak intensity at a wavelength of 340 nm.

In the present step, a time for irradiating the ultraviolet rays may be in a range of 60 minutes to 80 minutes. This is a time range optimized to remove a vertical stripe pattern caused by the non-reacted reactive mesogen and improve a VHR.

Figure 9:
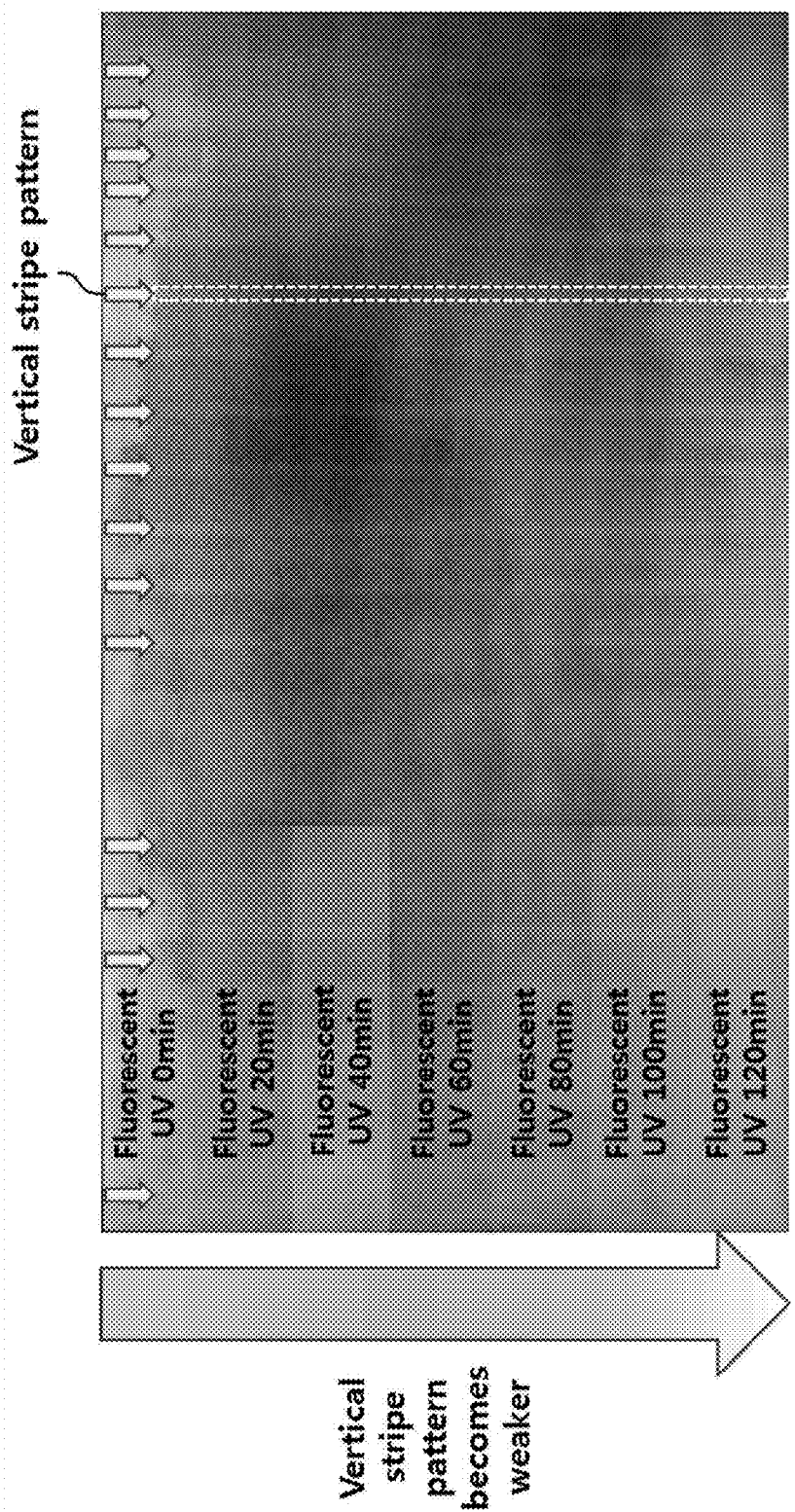
FIG. 9 illustrates a vertical stripe pattern in an alignment layer according to a time for exposure to secondary ultraviolet rays in the manufacturing method of a liquid crystal display according to an exemplary embodiment of the present invention.

FIG. 9 illustrates a vertical stripe pattern in an alignment layer according to a time for exposure to secondary ultraviolet rays in the manufacturing method of a liquid crystal display according to an exemplary embodiment of the present invention.

In FIG. 9, an alignment layer is divided into a plurality of horizontal regions and a time for exposure to secondary ultraviolet rays varies for each region.

Referring to FIG. 9, it could be observed that as a time for exposure to secondary ultraviolet rays increases (as going down in FIG. 9), a vertical stripe pattern is recognized as being weaker.

Figure 10:
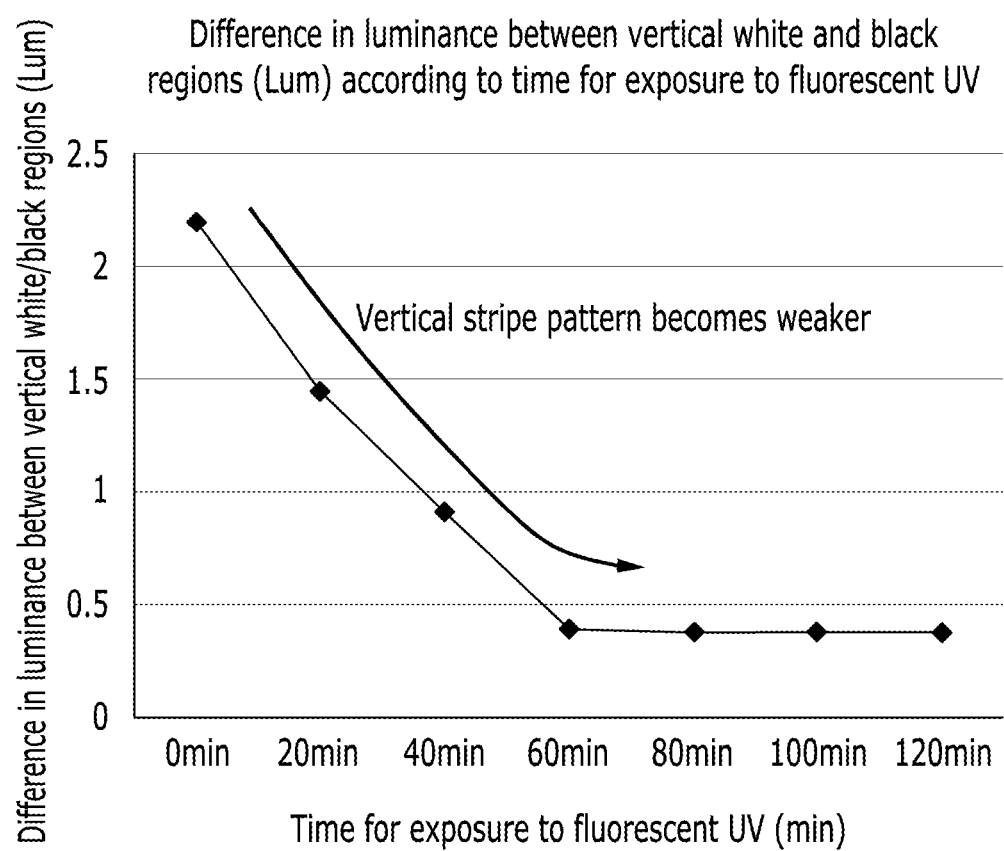
FIG. 10 is a graph illustrating a change in a vertical stripe pattern according to a time for exposure to secondary ultraviolet rays.

FIG. 10 is a graph illustrating a change in a vertical stripe pattern according to a time for exposure to secondary ultraviolet rays. In FIG. 10, a visibility of a vertical stripe pattern is illustrated by a difference in luminance between the vertical stripe pattern and a dark region.

Referring to FIG. 10, when a secondary exposure is not carried out (0 minute), a difference in luminance between the vertical stripe pattern and the other region is as high as 2 or more.

However, it could be seen that as a time for the secondary exposure increases, a difference in luminance decreases, and, thus, the vertical stripe pattern is less recognized. Referring to FIG. 10, a difference in luminance between the vertical stripe pattern and the other region decreases as a time for the exposure increases, and when a time for the exposure is 60 minutes or longer, the difference converges on a certain value.

That is, it can be seen that in order for the vertical stripe pattern to be minimally recognized, preferably, a time for exposure to ultraviolet rays may be 60 minutes or longer.

Figure 11:
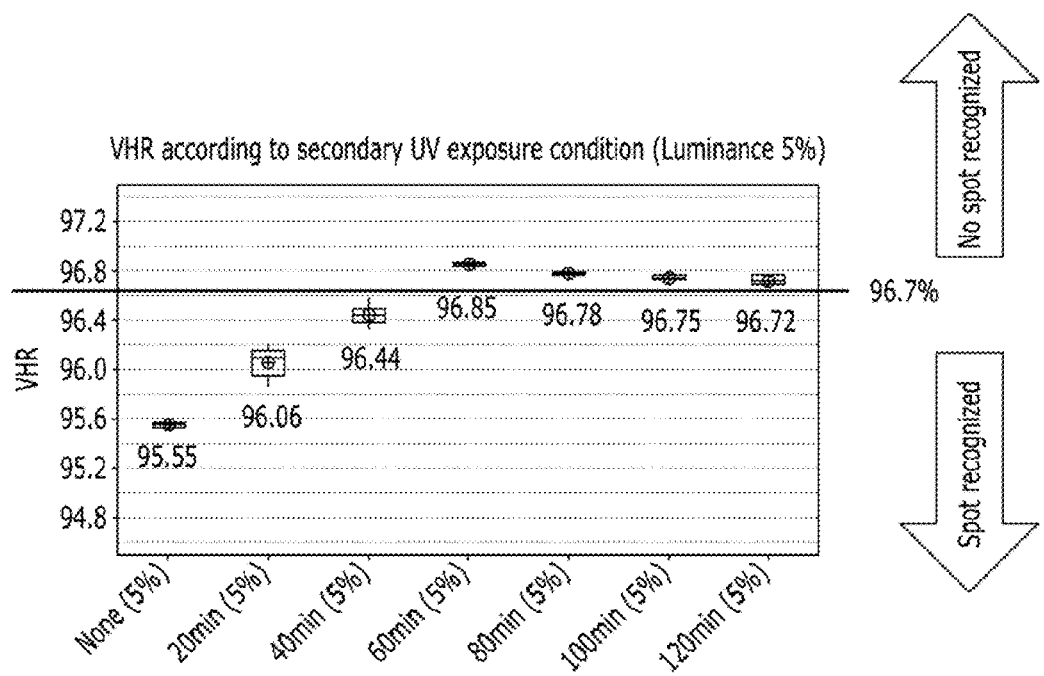
FIG. 11 is a graph illustrating a change in a VHR according to a secondary UV exposure condition.

FIG. 11 is a graph illustrating a change in a VHR according to a secondary UV exposure condition. A VHR is a value of an electric characteristic of a liquid crystal. When a VHR is about 96.7% or more, TFT spots (equi-spaced vertical stripes, water spots) in the liquid crystal display tend to disappear.

Typically, a VHR of a reactive mesogen alignment layer (Comparative Example of the present invention) which does not undergo a secondary exposure is 95.5%. Therefore, due to such a difference in VHR, TFT spots used to be recognized.

However, referring to FIG. 11, it can be seen that in the present invention, as a time for secondary exposure to ultraviolet rays increases, a VHR of the liquid crystal display increases. That is, as illustrated in FIG. 11, a VHR gradually increases as a time for the secondary exposure to ultraviolet rays increases, and when a time for the secondary exposure to ultraviolet rays is 60 minutes or longer, a VHR is 96.7% or more at which no spot is recognized. That is, when a time for the secondary exposure is 60 minutes, a VHR has the maximum value of 96.85%, and then, even if a time for the secondary exposure increases, a VHR is not further increased.

Accordingly, referring to FIG. 9 to FIG. 11, it can be seen that in the present invention, an optimum time for improving a vertical stripe pattern and water spots is 60 minutes or more. Further, as illustrated in FIG. 9 to FIG. 11, in the case of 60 minutes or more, an effect of improving a vertical stripe pattern and water spots is not further increased. It could be seen that in consideration of damage to the liquid crystal display and process efficiency, a most preferable time range for the secondary exposure is from 60 minutes to 80 minutes.

That is, in the manufacturing method of a liquid crystal display of the present invention, after the primary irradiation of ultraviolet rays for hardening reactive mesogen, ultraviolet rays having a wavelength of 300 nm to 360 nm are additionally irradiated for 60 minutes to 80 minutes to remove remaining reactive mesogen, so that non-reacted reactive mesogen is removed. Therefore, a vertical stripe pattern and water spots caused by the remaining reactive mesogen are prevented and a VHR as an electric characteristic is improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

GL, 121: Gate line
RL, 131: Divide reference voltage line
DL, 171: Data line
Clca, Clab: Liquid crystal capacitor
Qa, Qb, Qc: Switching element (Thin film transistor)
110, 210: Substrate
124a, 124b, 124c: Gate electrode
140: Gate insulating layer
154a, 154b, 154c, 157: Semiconductor
163a, 165a, 163b, 165b, 163c, 165c: Ohmic contact
173a, 173b, 173c: Source electrode
175a, 175b, 175c: Drain electrode
180p, 180q: Passivation layer
191a, 191b: Sub-pixel electrode
220: Black matrix or a first light blocking member
230: Color filter
11: Lower alignment layer
21: Upper alignment layer
30: Main chain
40: Vertical alignment side chain
50: Main reactive mesogen side chain
51: Sub-reactive mesogen side chain

What is claimed is:
1. A manufacturing method of a liquid crystal display comprising:

a step of preparing a lower panel in which a pixel electrode is formed and which is coated with a lower alignment layer including reactive mesogen;

a step of preparing an upper panel in which a common electrode is formed and which is coated with an upper alignment layer including reactive mesogen;

a step of forming a display panel assembly by injecting a liquid crystal between the lower panel and the upper panel and bonding the lower panel and the upper panel;

a step of pre-tilting the liquid crystal by applying a voltage to the display panel assembly and primarily irradiating ultraviolet rays having a wavelength of 310 nm to 380 nm; and a step of removing remaining reactive mesogen by secondarily irradiating ultraviolet rays having a wavelength of 300 nm to 360 nm to the display panel assembly.

2. The manufacturing method of a liquid crystal display of claim 1, wherein:

the lower alignment layer and the upper alignment layer include a main chain and one or more side chains connected to the main chain, and the side chain includes one or more reactive mesogen side chains.

3. The manufacturing method of a liquid crystal display of claim 2, wherein:

the one or more side chains include one or more kinds of vertical alignment side chain and two or more kinds of reactive mesogen side chain, and, the reactive mesogen side chain includes a main reactive mesogen side chain and a sub-reactive mesogen side chain.

4. The manufacturing method of a liquid crystal display of claim 1, wherein:

the main chain includes one or more selected from the group consisting of polyimide, polyamic acid, polyamide, polyamicimide, polyester, polyethylene, polyurethane, and polystyrene.

5. The manufacturing method of a liquid crystal display of claim 2, wherein:

the reactive mesogen side chain includes at least one acryl group or methacryl group at an end thereof.

6. The manufacturing method of a liquid crystal display of claim 1, wherein:

in the step of preparing a lower panel in which a pixel electrode is formed and which is coated with a lower alignment layer including reactive mesogen, the pixel electrode includes a first sub-pixel electrode and a second sub-pixel electrode.

7. The manufacturing method of a liquid crystal display of claim 6, wherein:

in the step of pre-tilting the liquid crystal by applying a voltage to the display panel assembly and primarily irradiating ultraviolet rays having a wavelength of 310 nm to 380 nm, by applying the voltage to the display panel assembly, different voltages are applied to the first sub-pixel electrode and the second sub-pixel electrode, respectively.

8. The manufacturing method of a liquid crystal display of claim 1, wherein:

the step of pre-tilting the liquid crystal by applying a voltage to the display panel assembly and primarily irradiating ultraviolet rays having a wavelength of 310 nm to 380 nm is performed for 30 seconds or more to 3 minutes or less.

9. The manufacturing method of a liquid crystal display of claim 1, wherein:

in the step of pre-tilting the liquid crystal by applying a voltage to the display panel assembly and primarily irradiating ultraviolet rays having a wavelength of 310 nm to 380 nm, the ultraviolet rays have a peak intensity at 365 nm.

10. The manufacturing method of a liquid crystal display of claim 2, wherein:

in the step of pre-tilting the liquid crystal by applying a voltage to the display panel assembly and primarily irradiating ultraviolet rays having a wavelength of 310 nm to 380 nm, the liquid crystal is aligned in a defined direction by applying the voltage, and the reactive mesogen side chain reacts so as to be hardened by primarily irradiating the ultraviolet rays.

11. The manufacturing method of a liquid crystal display of claim 1, wherein:

in the step of removing remaining reactive mesogen by secondarily irradiating ultraviolet rays having a wavelength of 300 nm to 360 nm to the display panel assembly, the ultraviolet rays have a peak intensity at 340 nm.

12. The manufacturing method of a liquid crystal display of claim 1, wherein:

in the step of removing remaining reactive mesogen by secondarily irradiating ultraviolet rays having a wavelength of 300 nm to 360 nm to the display panel assembly, a time for irradiating the ultraviolet rays is 60 minutes to 80 minutes.

13. The manufacturing method of a liquid crystal display of claim 1, wherein:

after the step of removing remaining reactive mesogen by secondarily irradiating ultraviolet rays having a wavelength of 300 nm to 360 nm to the display panel assembly, a voltage holding rate "VHR" of the liquid crystal display may be 96.7% or more.

14. The manufacturing method of a liquid crystal display of claim 1, wherein:

the step of removing remaining reactive mesogen by secondarily irradiating ultraviolet rays having a wavelength of 300 nm to 360 nm to the display panel assembly is performed in a state where a voltage is not applied to the display panel assembly.

15. The manufacturing method of a liquid crystal display of claim 1, wherein:

the wavelength of the ultraviolet rays used in the step of pre-tilting the liquid crystal by applying a voltage to the display panel assembly and primarily irradiating ultraviolet rays having a wavelength of 310 nm to 380 nm, is longer than the wavelength of the ultraviolet rays used in the step of removing remaining reactive mesogen by secondarily irradiating ultraviolet rays having a wavelength of 300 nm to 360 nm to the display panel assembly.

16. The manufacturing method of a liquid crystal display of claim 1, wherein:

the ultraviolet rays used in the step of removing remaining reactive mesogen by secondarily irradiating ultraviolet rays having a wavelength of 300 nm to 360 nm to the display panel assembly are fluorescent ultraviolet rays.

* * * * *